US010091229B2

(12) United States Patent
Stute et al.

(10) Patent No.: US 10,091,229 B2
(45) Date of Patent: Oct. 2, 2018

(54) SYSTEMS AND METHODS OF NETWORK SECURITY AND THREAT MANAGEMENT (75) Inventors: Michael Roy Stute, Plano, TX (US); Scott S. Paly, Asheville, NC (US)

(73) Assignee: Masergy Communications, Inc., Plano, TX (US)

( * ) Notice: Subject to any disclaimer, the term of this patent is extended or adjusted under 35 U.S.C. 154(b) by 1326 days.

(21) Appl. No.: 12/351,645

(22) Filed: Jan. 9, 2009

(65) Prior Publication Data
US 2009/0178139 A1 Jul. 9, 2009

Related U.S. Application Data (60) Provisional application No. 61/019,984, filed on Jan. 9, 2008.

(51) Int. Cl.
*G06F 21/00* (2013.01)
*H04L 29/06* (2006.01)
*G06F 21/55* (2013.01)

(52) U.S. Cl.
CPC ........ *H04L 63/1433* (2013.01); *G06F 21/552* (2013.01); *G06F 21/554* (2013.01); *H04L 63/0209* (2013.01); *H04L 63/1408* (2013.01); *H04L 63/1416* (2013.01); *H04L 63/1425* (2013.01)

(58) Field of Classification Search
CPC ............. H04L 63/1416; H04L 63/1425; H04L 63/1433; H04L 63/1408; G06F 21/554; G06F 21/552
USPC ..................... 726/2, 13, 21–25, 188; 713/188
See application file for complete search history.

(56) References Cited

U.S. PATENT DOCUMENTS

| 6,687,732 | B1 * | 2/2004 | Bector et al. ............... 709/200 |
| 7,293,238 | B1 * | 11/2007 | Brook ................... G06F 21/552 |
| | | | 709/224 |
| 7,913,303 | B1 * | 3/2011 | Rouland et al. ............. 726/23 |
| 7,934,253 | B2 * | 4/2011 | Overcash et al. ............ 726/22 |

(Continued)

OTHER PUBLICATIONS

Internet Security Systems™, Enhanced Dynamic Threat Protection™ via Automated Correlation Analysis, 2002, downloaded from http://www.arrowecs.at/gen/internet_security_systems/f/Site%20Protector%20Dynamic_Correlation.pdf on Dec. 16, 2012.*

*Primary Examiner* — Carl G Colin
*Assistant Examiner* — Gary E Lavelle
(74) *Attorney, Agent, or Firm* — McGuireWoods LLP (57) ABSTRACT The present disclosure generally provides systems and methods of network security and threat management. An exemplary system includes detection and prevention modules (DPM) designed specifically to collect and transmit suspicious binary network packet data. The collected network packets are sent to a behavioral correlation module to perform automatic behavioral correlation: (1) within each DPM, (2) across all DPMs installed on a network, and (3) across all DPMs installed on all networks. The results of the behavioral correlation are sent to a security dashboard module (SDM), which generally acts as a fully integrated Security Event Management system and collects, correlates, and prioritizes global network alerts, local network alerts, posted vendor alerts, and detected network vulnerabilities with enterprise assets. The SDM could display the results in a user-friendly graphical user interface and has the ability to perform geographic mapping of externally generated threats.

17 Claims, 5 Drawing Sheets (56) References Cited

U.S. PATENT DOCUMENTS

| | | | |
|---|---|---|---|
| 7,941,853 B2 * | 5/2011 | Rozenberg et al. | 726/22 |
| 2002/0178383 A1 * | 11/2002 | Hrabik | H04L 63/1433 |
| | | | 726/4 |
| 2003/0009696 A1 * | 1/2003 | Bunker | H04L 12/2602 |
| | | | 726/26 |
| 2003/0084349 A1 * | 5/2003 | Friedrichs et al. | 713/201 |
| 2003/0140249 A1 * | 7/2003 | Taninaka | G06F 21/577 |
| | | | 726/25 |
| 2004/0064731 A1 * | 4/2004 | Nguyen et al. | 713/201 |
| 2005/0229255 A1 * | 10/2005 | Gula et al. | 726/23 |
| 2007/0058540 A1 * | 3/2007 | Kay | 370/230 |
| 2007/0169194 A1 * | 7/2007 | Church | G06F 21/552 |
| | | | 726/23 |
| 2008/0127337 A1 * | 5/2008 | Dawson et al. | 726/22 |

\* cited by examiner

SYSTEMS AND METHODS OF NETWORK SECURITY AND THREAT MANAGEMENT

CROSS REFERENCE TO RELATED APPLICATION

This application claims benefit under 35 U.S.C. § 119(e) of U.S. Provisional Patent Application No. 61/019,984 filed on Jan. 9, 2008 in the United States Patent and Trademark Office entitled "System and Method of Threat Management." The entire disclosure of U.S. Provisional Patent Application No. 61/019,984 is incorporated by reference as if fully disclosed herein.

TECHNICAL FIELD

The present disclosure generally relates to information systems and, in particular, to systems and methods of managing network security and threats on a network.

BACKGROUND

Companies typically use various conventional security products that narrowly focus on specific aspects of network security, leaving authorized administrators such as, for example, an information technology (IT) department, generally responsible for selecting, integrating, managing, monitoring, and correlating discrete security events, alerts, logs, and reports into actionable security threats.

IT departments are generally forced to use a combination of conventional "best-of-breed" products that are not necessarily intended to work together. Other conventional products typically provide software applications that require setting up security and access rules that need to be initially programmed, updated periodically, and maintained on a regular basis.

Conventional software applications also typically require complicated integrations with an enterprise's existing systems and security related products. These integrations typically incur significant investments in time and resources in implementing hundreds if not thousands of correlation rules. In addition, most enterprises and vendors need to expend additional resources in training personnel to use, maintain, and upgrade these integrated systems.

There is, however, a need for systems and methods of efficiently and cost effectively providing threat management on a network without the need to install and integrate complex and expensive software with third-party security products.

SUMMARY

Embodiments of the present disclosure generally provide systems and methods of providing network security and threat management.

In one embodiment, the present disclosure could provide a system of managing security threats in a network. The system could include a detection module to collect information associated with binary network packet data. The system could also include a correlation module to analyze the collected information from the detection module, to identify potential security threats to the network, and to update subordinate applications with information related to the potential security threats.

In one embodiment, the present disclosure could provide a method of managing security threats in a network. The method could include collecting binary network packet data information related to network traffic. The method could also include comparing any known security threats to the security of the network with the binary network packet data information. If the comparison is successful, the method could further include generating a prioritized alert and updating subordinate applications with information associated with the binary network packet data and the prioritized alert.

In one embodiment, the present disclosure could provide a multi-network security system. The system could include a first detection module to collect information associated with incoming binary network packet data from a first network. The system could also include a second detection module associated with a second network to collect information associated with incoming binary network packet data from the second network. The system could further include a correlation module configured to analyze behavioral patterns related to potential security threats from the incoming binary network packet data from the first network and the second network. The system could still further include a remote database to store information associated with the analysis of the behavioral patterns. The system could further include a terminal to display information associated with the potential security threats in real-time.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure generally provides systems and methods of providing network security and threat management. In one embodiment, the present disclosure provides systems and methods of implementing network security based on behavioral network analysis and correlation in real-time and without correlation rule development.

Figure 1:
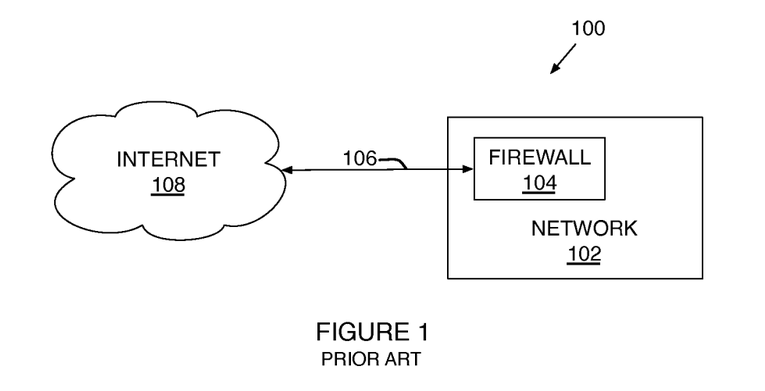
FIG. 1 is exemplary illustration of a conventional enterprise system network.

FIG. 1 is simplified illustration of a conventional enterprise system 100. It should be understood that system 100 shown in FIG. 1 is for illustrative purposes only and that any other suitable system or subsystem could be used in conjunction with or in lieu of system 100 according to one embodiment of the present disclosure.

System 100 could include enterprise network 102, firewall system or other similar device 104, and one or more connections 106 to Internet 108. Enterprise network 102 could include for example, a company, a group of companies, a department, a group of departments, a user, a group of users, database, group of databases, applications, group of applications, any suitable entity, or any combination thereof.

Firewall system 104 could include any suitable module, group of modules, applications, group of applications, any suitable software/hardware, or any combination thereof that examines aids in preventing unauthorized entities from accessing enterprise network 102 by following a set of predetermined rules after inspecting network traffic passing through it. In general, conventional enterprise system 100 uses firewall system 104 to protect enterprise network 102 from unauthorized access or misuse.

Figure 2:
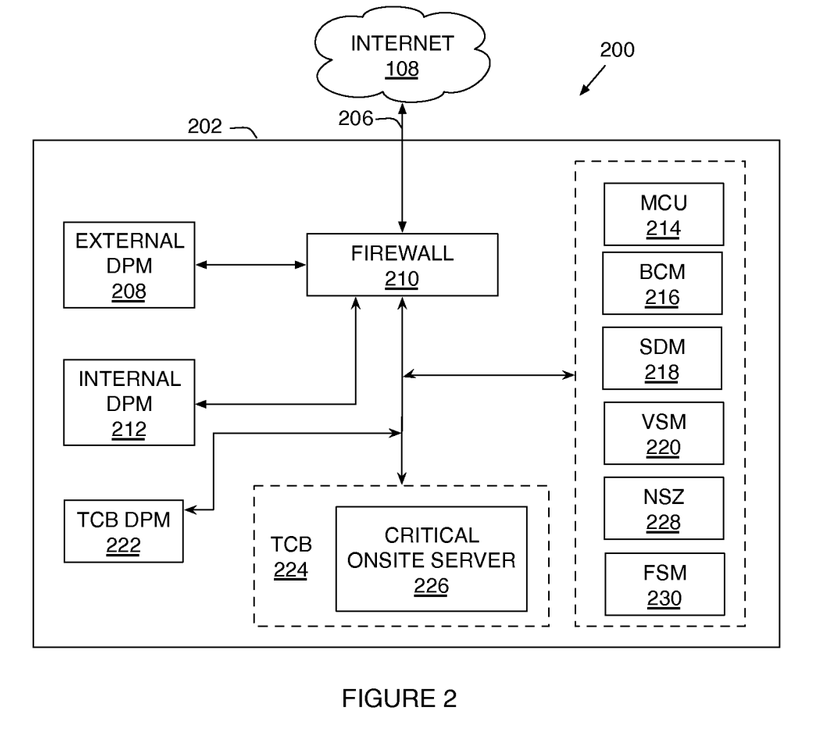
FIG. 2 is an exemplary illustration of a threat management system according to one embodiment of the present disclosure.

FIG. 2 is an exemplary illustration of network architecture layers of a threat management system 200 according to one embodiment of the present disclosure. It should be understood that system 200 shown in FIG. 2 is for illustrative purposes only and that any other suitable system or subsystem could be used in conjunction with or in lieu of system 200 according to one embodiment of the present disclosure.

In one embodiment, system 200 could generally provide, for example, systems for signature intrusion detection, behavioral intrusion detection, network behavioral analysis, network behavioral analysis and correlation, network access violations, vulnerability management, posted vendor alerts, log management and monitoring, foreign network behavioral analysis and correlation, low-level reconnaissance activities, global threat analysis and correlation, real-time correlation of known vulnerabilities and detected threats, continuous threat prioritization using measured detected network hostility of threats, threat management without rules correlation and development, tuning, or maintenance, other suitable behavioral analysis and correlation, or any combination thereof.

In one embodiment, system 200 could be implemented, customized, applied, or otherwise used by any suitable facility 202 with existing technologies or could be upgraded with emerging or future technologies. In one embodiment, facility 202 could include, for example, a company, a group of companies, a department, a group of departments, a user, a group of users, a database, a group of databases, applications, a group of applications, any suitable entity, or any combination thereof. System 200 could be used on its own or in conjunction with any suitable conventional system.

Enterprise 202 could have communication links with Internet 108 through a limited number of Internet connections 206. It should be understood that although only one Internet connection 206 is shown in FIG. 2, any suitable number of Internet connections 206 could be used in accordance with the present disclosure. It should also be understood that the term "Internet" 108 is used for illustration purposes only and that Internet 108 could be any other suitable network, Intranet, wire-line communication link, wireless communication link, any other suitable communication link, or any combination thereof.

Enterprise 202 could include one or more external detection and prevention modules (DPMs) 208, firewalls 210, internal DPMs 212, master control units (MCUs) 214, behavioral correlation modules (BCMs) 216, security dashboard modules (SDMs) 218, vulnerability scanner modules (VSMs) 220, trusted computing base (TCB) DPMs 222, TCBs 224, critical on-site servers 226, network access control modules (NSZs) 228, and log management modules or firewall syslog modules (FSMs) 230.

It should be understood that external DPM 208, internal DPM 212, and TCB DPM 222 are optional and that system 200 could be implemented, customized, applied, or otherwise used by facility 202 to enhance security without the use of DPM 208, internal DPM 212, and TCB DPM 222 to provide security in accordance with the present disclosure.

External DPM 208, internal DPM 212, and TCB DPM 222 could perform, for example, signature intrusion detection from known and potential threats, intrusion prevention, data packet collection, and behavioral packet analysis. External DPM 208, internal DPM 212, and TCB DPM 222 could generally be installed as a passive device to receive mirrored traffic from monitored network segments and does not necessarily require integration with any third-party devices. Although three detection and prevention modules (DPMs) are shown in FIG. 2, it should be understood that any suitable number of DPMs could be used in accordance with the present disclosure.

In one embodiment, external DPM 208 could be configured to receive mirrored traffic coming in from Internet 108 and leaving from enterprise 202. For example, external DPM 208 could monitor network activity at the perimeter of the secure facility. In addition, external DPM 208 could generally be located outside firewall and assumed to have a limited number of Internet connections 206.

Similarly, internal DPM 212 could be configured to receive mirrored traffic coming in and from entities within facility 202. In one embodiment, internal DPM 212 could be installed inside the firewall to monitor internal network traffic, outbound traffic to Internet 108, and correlate with inbound network traffic that makes it through the firewall. Likewise, TCB DPM 224 could be configured to receive mirrored traffic coming in and from TCB 124. For example, in one embodiment, TCB DPM 222 could be installed to monitor network activity to and from the critical network servers associated with TCB 224.

In one embodiment, external DPM 208, internal DPM 212, and TCB DPM 222 could generally perform network packet collection and normalization by, for example, using a number of different analysis functions such as signature detection and prevention functions on the captured network traffic before transmitting it to BCM 216 for further analysis, correlation, and storage as described in detail herein.

External DPM 208, internal DPM 212, and TCB DPM 222 could automatically "learn and remember" clients that typically access servers associated with their respective portions of network activity. For example, external DPM 208, internal DPM 212, and TCB DPM 222 could learn and remember any information associated with any binary network packet data associated with the network activity or traffic such as, for example, protocols, IP ports, addressing information, security levels, priority levels, source information, destination information, access times, other suitable network related information, or any combination thereof that could be associated with a particular transaction, access attempt, database, network location, user, user's location, or any other network related information when accessing network servers.

In one embodiment, for example, TCB DPM 222 could automatically "learn and remember" clients that typically access servers associated with TCB 224. TCB DPM 222 could also learn and remember any protocols, IP ports, addressing information, security levels, priority levels, other suitable network related information, or any combination thereof that could be associated with a particular transaction, user, or user's location when accessing TCB 224 or other entities such as, for example, network servers, databases, applications, and accounts associated with TCB 224.

In one embodiment, external DPM 208, internal DPM 212, and TCB DPM 222 could perform initial signature intrusion detection and prevention algorithm by detecting an unknown client (internal or foreign) attempting to access a secured server, use an unknown protocol, or from a different or previously undetected IP port, behavioral correlation module (BCM) 216 could generate a resource violation reporting such activity as described in detail herein. In other words, after external DPM 208, internal DPM 212, and TCB DPM 222 initially perform signature intrusion detection and prevention analysis, suspicious network packets are collected and transmitted to BCM 216 for further analysis and behavioral correlation.

BCM 216 could perform a multi-stage analysis on suspicious network packets sent from external DPM 208, internal DPM 212, and TCB DPM 222. For example, in an initial stage, BCM 216 could perform behavioral correlation on the data collected from an individual DPM (e.g., one of external DPM 208, internal DPM 212, and TCB DPM 222). In a first exemplary stage, BCM 216 could correlate suspicious activity within an individual DPM, while in a second exemplary stage, BCM 216 could correlate behaviorally detected suspicious traffic across multiple DPMs within a customer network. Unlike conventional systems, BCM 216 could include the ability to detect whether a single hostile source is employing various techniques on different parts of system 200, or if multiple hostile sources are employing various techniques on a common target destination.

In addition, BCM 216 could determine whether systems associated with enterprise 202 are communicating and how such communications are carried out. For example, BCM 216 could determine what protocols such communications are being used, the amount data transferred in both directions at a particular point or group of points in enterprise 202, the number of packets necessary to carry out such communications, any anomalies in the protocol semantics, the speed of the associated data transfers, other suitable characteristics or anomalies, or any combination thereof. BCM 216 could also check historical information to determine if the above-described determinations perform in an acceptable manner and in accordance with data that could have been empirically recorded previously. For example, BCM 216 could check and verify how often and how "normal" certain functions are carried out within enterprise 202.

Correlation techniques performed by BCM 216 could be employed in real-time data. BCM 216 could also employ correlation techniques and combine correlated information with vast amounts of historical data. By doing so, BCM 216 could facilitate detection of seemingly discrete or low priority events that span hours, days, weeks, and months and correlate such events to identify possible threats or behavioral patterns that would otherwise not be identified. For example, suppose an attacker intentionally spreads out reconnaissance activities broadly across network and do so incrementally over time. The attacker is likely trying to exploit the weaknesses of traditional discrete signature-based solutions or rule-based behavioral solutions that are unable to capture, retain, and continually correlate these events to detect a potential attack.

Accordingly, with the performance of this first stage, BCM 216 could correlate information and perform behavioral correlation to provide advanced warning of potential security violations, threats, vulnerabilities, and attacks that could occur within a particular location of facility 202.

In a second stage, BCM 216 could then perform behavioral correlation on the data collected across each DPM 208 at facility 202. For example, for facility 202, BCM 216 could perform behavioral correlation at each of external DPM 208, internal DPM 212, and TCB DPM 222 and correlate the data collectively.

In one embodiment, BCM 216 could determine network statistical values for network traffic based on, for example, source address, destination address, source port, destination port, alert name, other suitable discernable traffic information, or any combination thereof to determine hostility. BCM 216 could then compare such statistical and traffic related information with those collected by each of external DPM 208, internal DPM 212, TCB DPM 222, and any other DPMs associated with facility 202. BCM 216 could then generate a master list of hostile source address, destination address, source port, destination port, alert name, other discernable traffic information, or any combination thereof within or associated with facility 202 to compare to empirically recorded historical normal values.

Accordingly, after performing the second stage of this analysis, BCM 216 could correlate information and perform behavioral correlation to provide advanced warning of potential security violations, threats, vulnerabilities, and attacks that could occur within facility 202.

Finally, in a third stage, BCM 216 or other similar device or module, could perform behavioral correlation on the data collected across all DPMs in facility 202 (e.g., each of external DPM 208, internal DPM 212, and TCB DPM 222) and other facilities, including other client sites, not shown in FIG. 1. These "global alerts" could be analyzed by each participating commercial network security system that could be vulnerable to the same type of attack technique. For example, these global alerts could be valuable to customers who are similarly situated, configured, or vulnerable.

Global alerts could provide such customers with insights into what vulnerabilities have been detected with other customers. For example, although certain activity may not have been detected on customer A's network, certain information gained from another customer's network could provide customer A with a "heads up" on such activity. Global alerts therefore provide information related to detections on other networks and provide warnings of where a particular network could be vulnerable.

In one embodiment, BCM 216 could determine network statistical values for network traffic using external sensors or external DPMs on, for example, the Internet, a public network, a semi-public network, or any other network external to facility 202. These external sensors could collect and detect information based on, for example, source address, destination address, source port, destination port, alert name, other suitable discernable traffic information, or any combination thereof to determine patterns on the Internet, public network, or semi-public network. BCM 216 could then compare the statistical and traffic related information with those collected by each external DPMs. After collecting such information related to traffic external to facility 202, BCP 216 could generate a master list of hostile source address, destination address, source port, destination port, alert name, other discernable traffic information, or any combination thereof to compare to empirically recorded historical normal values.

Accordingly, after performing the third stage of this analysis, BCM 216 could correlate information and perform behavioral correlation to provide advanced warning of potential security violations, threats, vulnerabilities, and attacks that could occur within facility 202 and at other facilities.

It should be understood that although BCM 216 is described as performing three stages of behavioral analysis, BCM 216 could perform any suitable number of data correlations and analyze activity at any suitable number of DPMs within or outside facility 202 in accordance with the present disclosure.

Security dashboard module (SDM) 218 could include a fully integrated threat management system designed to generally collect, correlate, and prioritize threats to provide, for example, global network alerts, local network alerts, posted vendor alerts, scanning alerts, detected network vulnerabilities with enterprise assets, other behaviorally traced threats, other suitable alerts or vulnerabilities, or any combination thereof. SDM 218 continuously monitors and updates its repository of all known alerts, threats, vulnerabilities and signature intrusion detection signatures that are collected, integrated, correlated, and normalized by a central resource from external sources.

SDM 218 automatically allocates every identified signature, behavioral alert, vendor alert, scanning alert, and known exploits into a user-extendable taxonomy, representing the intrinsic risk of each attack. The risks can be modified according to a user's security posture, and custom correlation rules can be added to tune pre-exploit threats. In addition, SDM 218 could generally reduce false positives and enhances alert relevance by matching inbound event data from intrusion detection or prevention sensors with results from VSM 220. In one embodiment, this process escalates attacks that have the highest potential to be successful and modifies the risk associated with other attacks based on correlation of VSM 220 scan results and age of the alert.

In one embodiment, SDM 218 could automatically and continuously correlate, consolidate, and prioritize all threats and vulnerabilities to the networks associated with facility 202 into a single, simple screen display, database, report, terminal, or other device. SDM 218 could display or otherwise generate a prioritized list of posted independent software vendor threats and automatically correlates them with the corporate assets on the network. Posted vendor threats which the corporate assets are not vulnerable to will not be displayed. In addition, SDM 218 could include various log producing systems, biometric readers, reports, analysis data, other suitable information, databases, or systems, or any combination thereof to display, verify, or otherwise report data related to the threats.

In one embodiment, SDM 218 is fully automated and does not require any initialization during setup, rule configuration, or tuning to enable its functionality. In addition, because SDM 218 correlates raw packet level information collected and analyzed by DPMs (e.g., external DPM 208, internal DPM 212, and TCB DPM 222) and BCM 216, and correlates this information with the detected assets, vulnerability reports, and posted vendor alerts, SDM 218 does not require integration with third-party products.

Accordingly, in one embodiment, SDM 218 could aid in assessing, ranking, prioritizing, reporting, and correlating potential threats and intelligently focus local IT resources on prevention and remediation activities. For example, SDM 218 could correlate each prioritized threat and provide access to forensic information, comprehensive lists of vulnerable assets, associated vulnerability reports, prevention/remediation instructions, other instructions, or any combination thereof. In addition, SDM 218 generally aids in providing a successful security event management system by generating alerts from multiple and complex sources by linking threats to the business assets they target. Such alerts are valuable, relevant, and useful to both operators and management associated with facility 202. The alerts and information related to the alerts could be displayed in real-time to visually convey where any threats may have originated in data, tabular, chart, graph, geographical map, any suitable display, or any combination thereof.

In one embodiment, based on the class of attack being used, the vulnerability of the target (including the age of the vulnerability data) and the importance of the assets involved, SDM 218 dynamically prioritizes the attack details as the events are received. In one embodiment, SDM 218 adjusts the threat priority dynamically as a result of its continuous security event analysis and correlation processing. Accordingly, SDM 218 performs behavioral correlation algorithms that automatically identify threats before they become compromises, and require nothing more than limited access to the facility's network to keep the internal asset and threat database updated.

In one embodiment, SDM 218 could provide a two-way communication system that truly integrates the collection, aggregation, and correlation of information and feeds such information to any suitable underlying systems or subsystems associated with facility 202 or other facilities for robust data sharing and feedback. Unlike traditional SIM/SEM technologies, which only generally collect and aggregate static log report information, SDM 218 could provide a smart, integrated system in which log information and other information could be shared, correlated, prioritized, aggregated, and analyzed with other related systems and subsystems to provide feedback and enhanced protection schemes. It should be understood that other subsystems associated with facility 202 such as, for example, MCU 214, BCM 216, VSM 220, NSZ 228, and FSM 230 could also provide such enhanced protection schemes in accordance with the present disclosure.

Facility 202 could also include vulnerability scanner module (VSM) 220. VSM 220 proactively identifies vulnerabilities to critical infrastructures at facility 202. For example, when VSM 220 detects a vulnerability in system 200, the detected vulnerability could be fed back into an intrusion detection algorithm. Here, the vulnerabilities could be correlated to provide context and possibly increase the priority of what would otherwise appear as a low-priority signature, group of low-priority signatures, behavioral alert, or groups of behavioral alerts.

In one example, most intrusion detection algorithms could have the ability to detect the presence of protocol specific traffic such as, for example, SSH-1 traffic on a network and normally would identify such traffic as a low-priority event. However, when SSH-1 traffic is detected against a device that could potentially be vulnerable to an SSH-1 exploit, then, under this context, this event could be classified as a high-priority event in terms of incident response. Accordingly, in one embodiment, the present disclosure not only identifies known vulnerabilities, it also could detect suspicious traffic against such known vulnerabilities.

In addition, VSM 220 provides visual context and correlation of suspicious network activity against vulnerable areas of the network associated with facility 202. For example, in one embodiment, VSM 220 could reclassify the alert priority and use different colors to display the alerts on a monitoring console to highlight the severity of the situation at hand. VSM 220 could be configured to communicate and report vulnerabilities to, for example, BCM 216, SDM 218, and MCU 214. Accordingly, VSM 220 attempts to discover and eliminate potential vulnerabilities and threats to system 200 before they are implemented.

System 200 could also include NSZ 228 as an integrated module associated with SDM 218. In one embodiment, NSZ 228 could provide a graphical representation of state of the network associated with facility 202. For example, in a single screen, NSZ 228 could provide a graphical representation of the network's security posture. NSZ 228 could also identify and correlate any violations of the network's access policy associated with the network's vulnerable assets and system resources. For example, NSZ 228 could identify and correlate access policies associated with vulnerable assets and resources with behavioral and signature alerts that may be required. In cases where the network assets in violation is identified or associated with a particular detected vulnerability, infection, or compromise, NSZ could prioritize such vulnerabilities within the context of the measured hostility.

System 200 could also include FSM 230 to integrate security logs that may have been generated by third party products associated with system 200. In one embodiment, FSM 230 could simultaneously monitor, capture, and archive logging information from any syslog producing device from, for example, firewall 210, any other firewalls, switches, routers, domain controllers, application servers, clients, other suitable entity associated with system 200, or any combination thereof.

When FSM 230 is integrated into or with SDM 218, system 200 could have the ability to extend visibility and unify a rendering of the entire network security posture. In addition, system 200 could have the ability to include future applications and devices beyond the scope of those natively integrated with system 200 such as, for example, foreign devices and networks. Accordingly, in one embodiment, FSM 230 could provide foreign security information integrated with system 200 information in a single screen graphical rendering of the of the entire network security posture. For example, FSM 230 could identify and correlate third party security events with vulnerable assets and system resources, associated behavioral and signature alerts, and the like. In one embodiment, the reporting device event or violation could be identified and associated by FSM with a detected vulnerability, infection, or compromise, and prioritized within the context of measured hostility.

Figure 3:
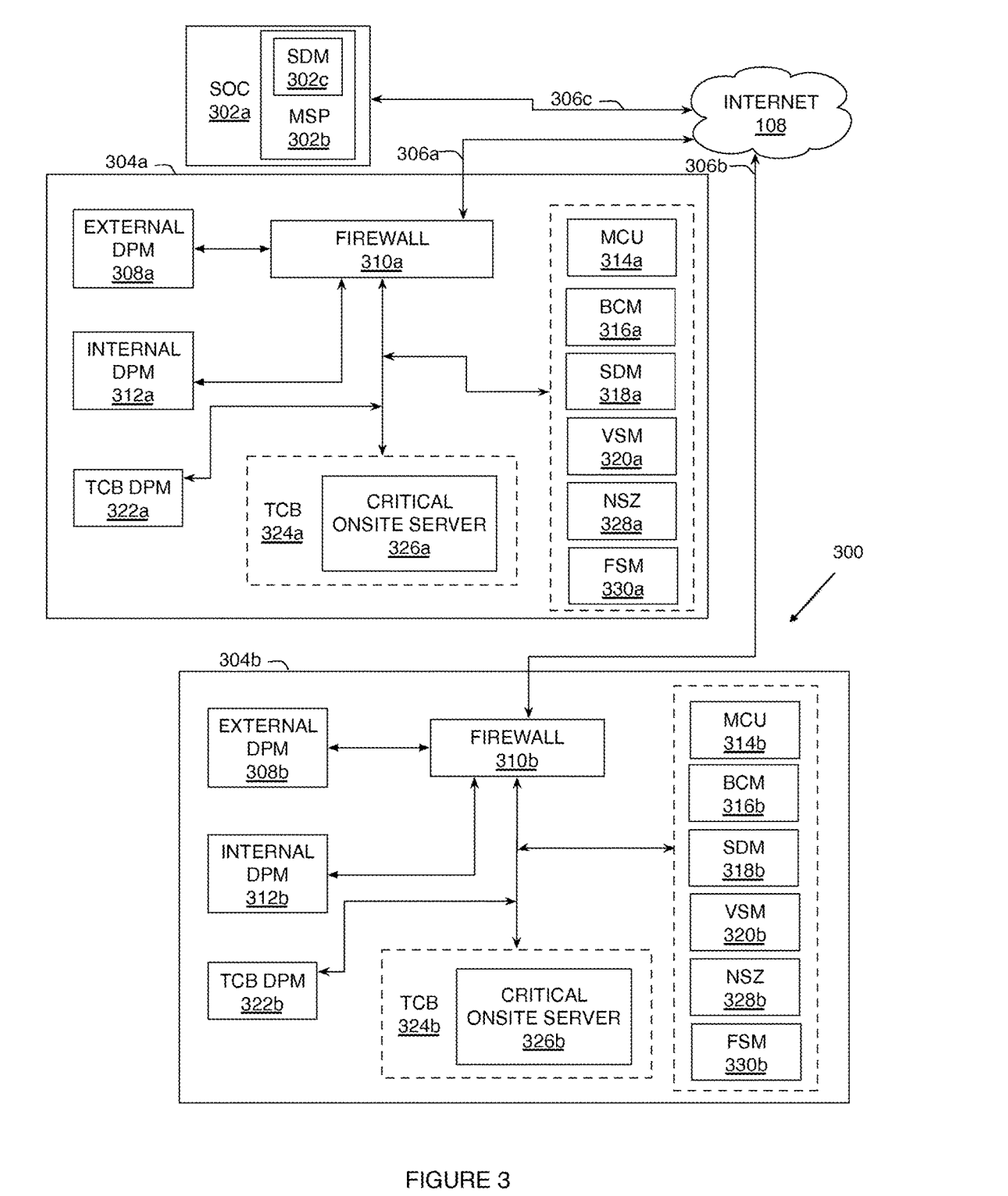
FIG. 3 is an exemplary illustration of a remote security operation center (SOC), a managed security platform (MSP), a security dashboard module (SDM), and additional network architecture layers associated with the threat management system shown in FIG. 2.

System 200 shown in FIG. 2 is generally scalable and could include additional tiers in the architectural deployment of the threat management system as shown in FIG. 3.

FIG. 3 is an exemplary illustration of a remote security operation center (SOC) 302a, a managed security platform (MSP) 302b, and additional network architecture layers associated with the threat management system shown in FIG. 2. It should be understood that system 300 shown in FIG. 3 is for illustrative purposes only and that any other suitable system or subsystem could be used in conjunction with or in lieu of system 300 according to one embodiment of the present disclosure.

System 200 shown in FIG. 2 could be scaled to monitor additional networks or similar systems to service one or more entities such as, for example, one or more companies, group of companies, affiliates, departments, group of departments, users, group of users, databases, group of databases, applications, group of applications, any suitable entities, or any combinations thereof by using SOC 302a, MSP 302b, and SDM 302c. The additional network architectural layers could be centrally located relative to each layer or geographically disperse relative to each layer.

System 300 shown in FIG. 3 could be implemented, customized, applied, or otherwise used by any suitable additional network architectural layer such as by having two enterprise facilities 304a and 304b (collectively referred to herein as facilities 304). Facilities 304 could include one or more companies, group of companies, departments, group of departments, users, group of users, databases, group of databases, applications, group of applications, any suitable entities, or any combinations thereof. System 300 could be used on its own or in conjunction with any suitable conventional system.

SOC 302a, MSP 302b, and SDM 302c could provide transparent access to all security risk management reports, DPM monitoring communications, signature and behavioral alerts, MCUs 314, BCMs 316, VSMs 320, SDMs 318, or TCBs 224, critical on-site servers 326, or any other device associated with facility 304, while leaving system administration functions and controls at each respective local secure facilities 304a and 304b. MSP 302b could also generally facilitate service creation, real-time monitoring, and holistic view of the security posture of multiple discrete customer networks using SDM 302c. In one embodiment, SDM 302c could collect, aggregate, and correlate information from SDM 318a, SDM 318b, and any other SDM modules associated with system 300.

In one embodiment, SDM 302c provides a two-way communication system that truly integrates the collection, aggregation, and correlation of information and feeds such information to any suitable underlying systems or subsystems associated with facilities 304 or other facilities for robust data sharing and feedback. Unlike traditional SIM/SEM technologies, which only generally collect and aggregate static log report information from a particular network, SDM 302c could provide a smart, integrated system in which log information and other information from multiple systems or networks could be shared, correlated, prioritized, aggregated, and analyzed with other related systems and subsystems to provide feedback and enhanced protection schemes for multiple systems or networks. It should be understood that other subsystems associated with facilities 304 such as, for example, MCUs 314a and 314b, BCMs 316a and 316b, VSMs 320a and 320b, NSZs 328a and 328b, and FSMs 330a and 330b could also provide such enhanced protection schemes in accordance with the present disclosure.

Facilities 304 could have communication links with Internet 108 through a limited number of network or Internet connections 306a and 306b. In addition, SOC 302a could communicate with Internet 108 using Internet connection 306c. Internet connections 306a, 306b, and 306c are collectively referred to herein as Internet connections 306. It should be understood that although only a limited number of Internet connections are shown in FIG. 3, any suitable number or configurations of Internet connections 306 could be used in accordance with the present disclosure. In addition, Internet connections 306 need not necessarily be communication links to Internet 108, but rather could be any other suitable network connections, Intranet links, wire-line communication links, wireless communication links, any other suitable communication links, or any combination thereof.

In one embodiment, facilities 304 could include one or more external detection and prevention modules (DPMs) 308a and 308b (collectively referred to as external DPMs 308), firewalls 310a and 310b (collectively referred to herein as firewalls 310), internal DPMs 312a and 312b (collectively referred to herein as internal DPMS 312), master control units (MCUs) 314a and 314b (collectively referred to herein as MCUs 314), behavioral correlation modules (BCMs) 316a and 316b (collectively referred to herein as BCMs 316), security dashboard modules (SDMs) 318a and 318b (collectively referred to herein as SDMs 318), vulnerability scanner modules (VSMs) 320a and 320b (collectively referred to herein as VSMs 320), trusted computing base (TCB) DPMs 322a and 322b (collectively referred to herein as TCB DPMs 322), TCBs 324a and 324b (collectively referred to as TCBs 324, and critical on-site servers 326a and 326b (collectively referred to herein as critical on-site servers 326).

In one embodiment, SOC 302a could remotely monitor additional network architectural layers such as facilities 304a and 304b and accordingly scale a particular enterprise's needs. With the aid of MSP 302b, SOC 302a could connect to MCUs 314 at each of subordinate facilities 304 through the use of encrypted connections 306.

Figure 4:
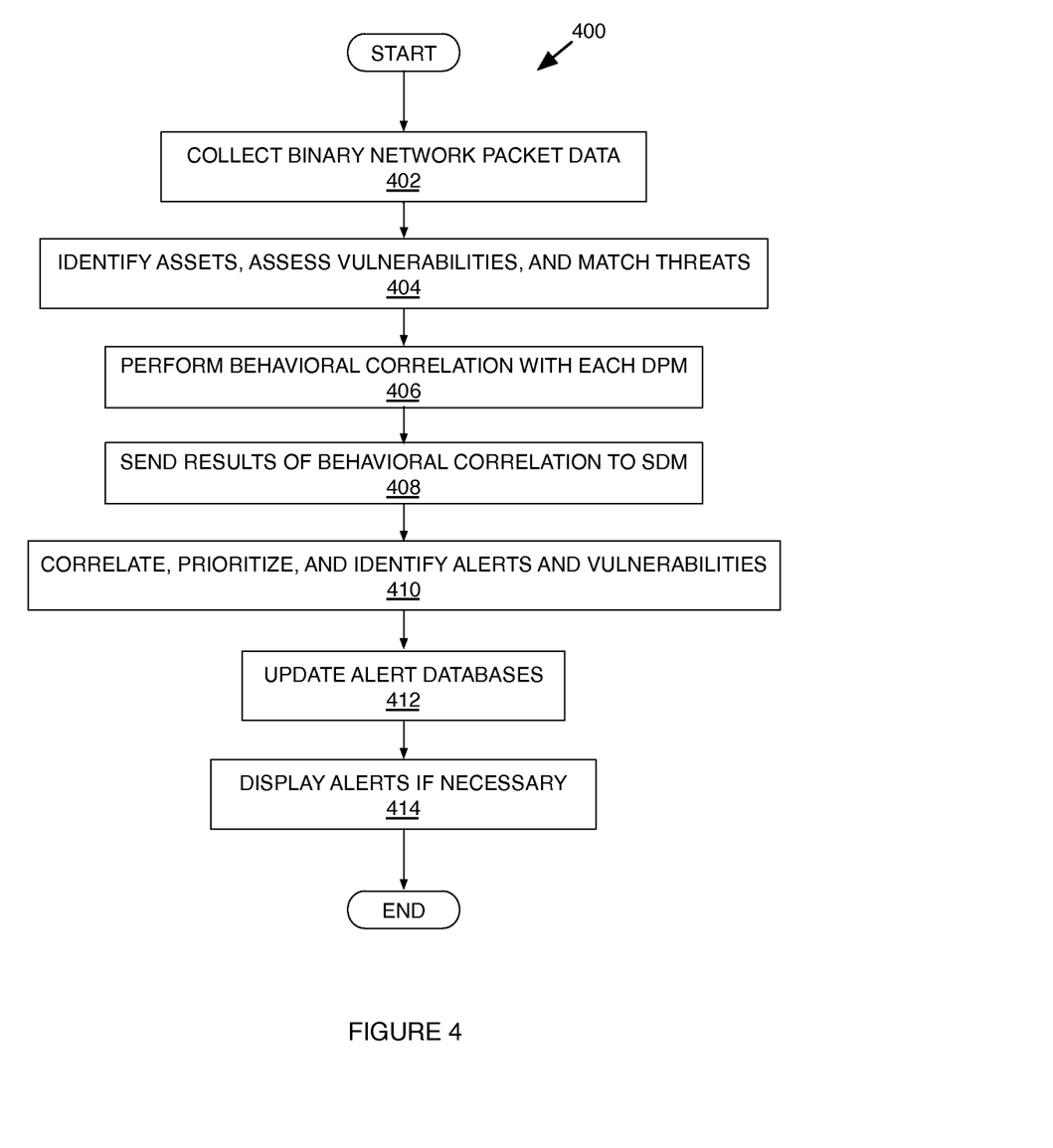
FIG. 4 is an exemplary illustration of a method of managing network security, threats, network information, and global network information according to one embodiment of the present disclosure.

FIG. 4 is an exemplary illustration of method 400 of managing network security, threats, network information, and global network information according to one embodiment of the present disclosure. It should be understood that method 400 shown in FIG. 4 is for illustrative purposes only and that any other suitable system or subsystem could be used in conjunction with or in lieu of method 400 according to one embodiment of the present disclosure.

Although method 400 is described in conjunction with processing network packets that could transmit suspicious binary network packet data associated with security and threats, it should be understood that the general steps shown and described for method 400 could also generally be used in conjunction with processing network information and global network information.

Method 400 could include using detection and prevention modules (DPM) such as, for example, external DPM 208, internal DPM 212, and TCB DPM 222 shown in FIG. 2, to collect and transmit suspicious binary network packet data associated with the network in step 402. In step 404, method 400 could include identifying assets, assessing vulnerabilities, and matching prioritized security threats with assets in real-time using a behavioral correlation module (BCM) such as, for example, BCM 216 shown in FIG. 2.

In step 406, method 400 could include performing behavioral correlation: (1) within each DPM, (2) across all DPMs installed on a corporate network, and (3) across all DPMs installed on all corporate networks using BCM 216. BCM 216 could automatically learn the network and continuously adjust over time as the network evolves. In step 408, the results of the behavioral correlation are sent to a security dashboard module (SDM) such as SDM 218 shown in FIG. 2.

In step 410, method 400 could continue by having SDM 218 collects, correlates, and prioritizes, for example, any global network alerts, local network alerts, posted vendor alerts, and detected network vulnerabilities with enterprise assets. The behavioral correlation algorithms applied by SDM 218 automatically identify threats before they become compromises, and require nothing more than limited access to the corporate network to keep internal assets of SDM 218 and any threat databases updated in step 412.

In step 414, method 400 continues by displaying the results from SDM 218 in a user-friendly graphical user interface for review and action by appropriate authorities. For example, the results could be displayed in real-time or at a later time to visually convey where such threats may have originated from (or any other related information) in data, tabular, chart, graph, geographical map, any suitable display, or any combination thereof.

It should be understood that the steps included in method 400 either in its entirety, any individual step, series of steps, or set of steps could be repeated, performed in any order, or simultaneously performed according to one embodiment of the present disclosure.

Figure 5:
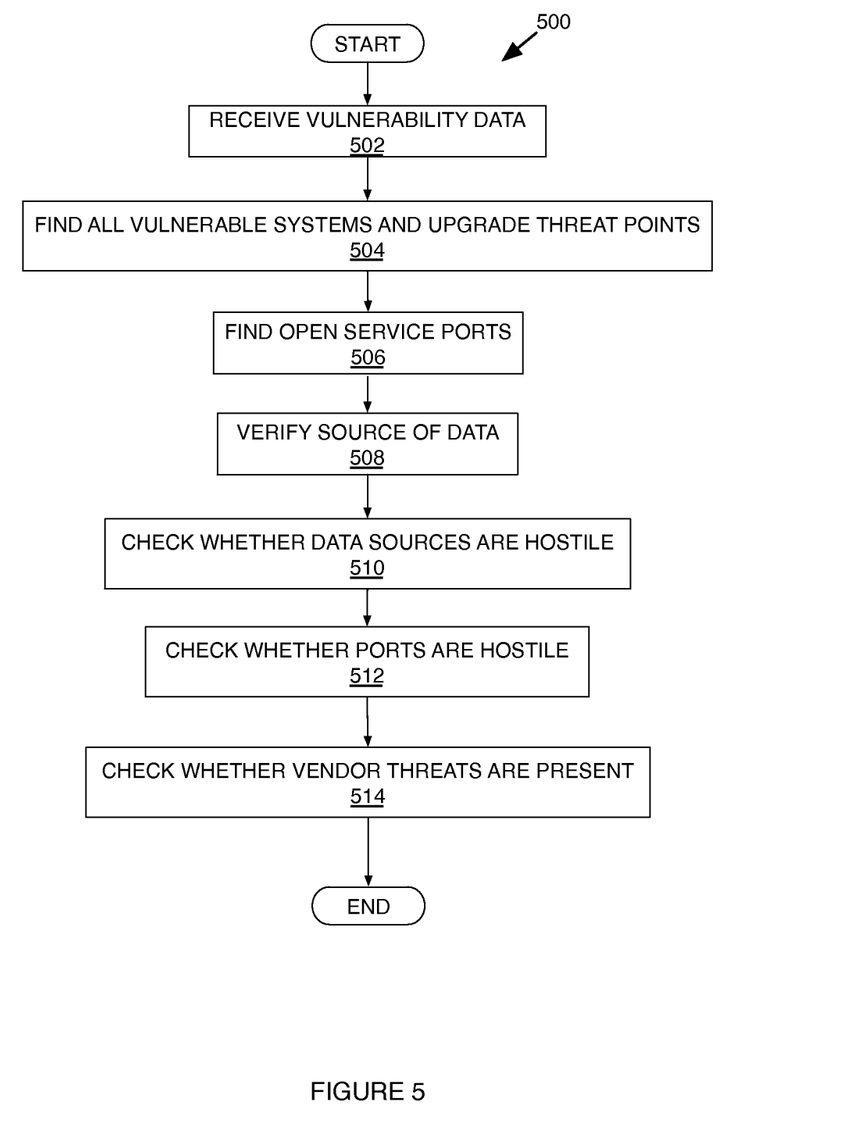
FIG. 5 is an exemplary illustration of a method of processing scanning alerts according to one embodiment of the present disclosure.

FIG. 5 is an exemplary illustration of method 500 of generally processing scanning alerts according to one embodiment of the present disclosure. It should be understood that method 500 shown in FIG. 5 is for illustrative purposes only and that any other suitable system or subsystem could be used in conjunction with or in lieu of method 500 according to one embodiment of the present disclosure.

In step 502, method 500 could include receiving data associated with vulnerabilities in a network sent to a security dashboard module or similar device such as, for example, SDM 218 shown in FIG. 2.

In step 504, SDM 218 could generally find all systems identified by the data received in step 502 and, in turn, upgrade each identified system with the appropriate threat points associated with such data.

In step 506, SDM 218 could search for and identify any open service ports that could be affected by the vulnerabilities received in step 502. In addition, SDM 218 could, in turn, upgrade each identified open service port with the appropriate threat points associated with such vulnerabilities.

In step 508, SDM 218 could verify the source of the data received in step 502. For example, SDM 218 could check the corresponding network data packets on a detection and prevention module (DPM) such as, for example, external DPM 208, internal DPM 212, and TCB DPM 222 shown in FIG. 2, to find if there is network traffic coming in or out from that source. If so, SDM 218 could upgrade each identified source or DPM with the appropriate threat points associated with the vulnerability data.

In step 510, method 500 could continue by having SDM 218 check sources of network data packets for any hostile activity. If so, SDM 218 could upgrade the source with the appropriate threat points associated with the vulnerability data.

In step 512, method 500 could continue by having SDM 218 check system ports for any hostile activity. If so, SDM 218 could upgrade the system ports with the appropriate threat points associated with the vulnerability data.

In step 514, method 500 could check if there are any vendor threats present. If so, SDM 218 could upgrade the system the appropriate threat points to reflect the vendor threats.

It should be understood that the steps included in method 500 either in its entirety, any individual step, series of steps, or set of steps could be repeated, performed in any order, or simultaneously performed according to one embodiment of the present disclosure.

Figure 6:
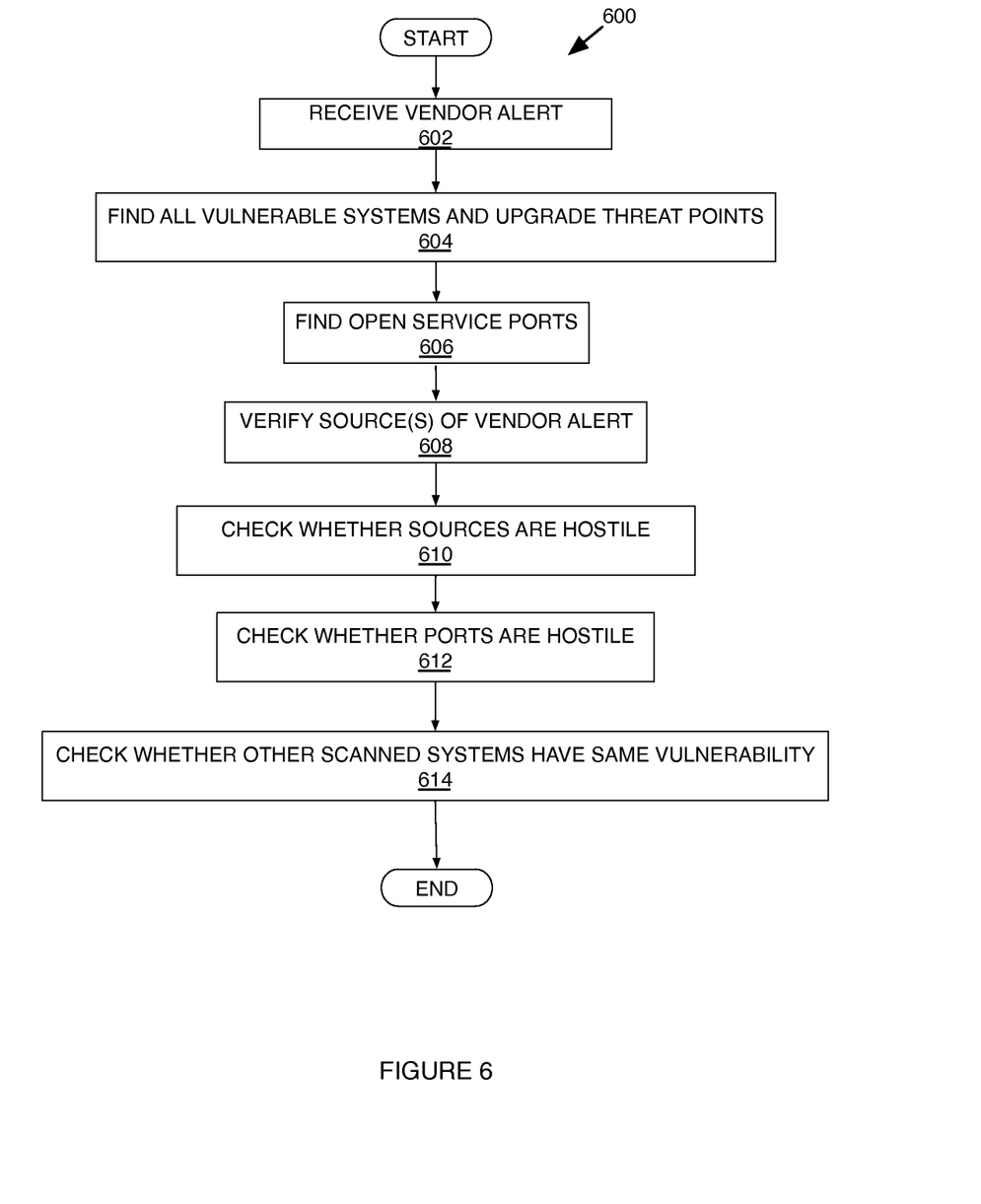
FIG. 6 is an exemplary illustration of a method of processing vendor alerts according to one embodiment of the present disclosure.

FIG. 6 is an exemplary illustration of method 600 of generally processing scanning alerts according to one embodiment of the present disclosure. It should be understood that method 600 shown in FIG. 6 is for illustrative purposes only and that any other suitable system or subsystem could be used in conjunction with or in lieu of method 600 according to one embodiment of the present disclosure.

In step 602, method 600 could include receiving a vendor alert to a security dashboard module or similar device such as, for example, SDM 218 shown in FIG. 2.

In step 604, SDM 218 could generally find all systems vulnerable entities associated with the vendor alert received in step 602 and, in turn, upgrade each identified system with the appropriate threat points associated with such data.

In step 606, SDM 218 could search for and identify any open service ports that could be affected by the vendor alert received in step 602. In addition, SDM 218 could, in turn, upgrade each identified open service port with the appropriate threat points associated with the vendor alert.

In step 608, SDM 218 could identify the source of the vendor alert received in step 602. For example, SDM 218 could check a corresponding detection and prevention module (DPM) such as, for example, external DPM 208, internal DPM 212, and TCB DPM 222 shown in FIG. 2, to find whether there is network traffic coming in or out from that source. If there is, SDM 218 could upgrade each identified source or DPM with the appropriate threat points associated with the vendor alert.

In step 610, method 500 could continue by having SDM 218 check the sources of the vendor alert for any hostile activity. If so, SDM 218 could upgrade the sources with the appropriate threat points associated with the vendor alert.

In step 612, method 600 could continue by having SDM 218 check system ports for any hostile activity. If so, SDM 218 could upgrade the system ports with the appropriate threat points associated with the vendor alert.

In step 614, method 600 could check if there are any vendor threats present. If so, SDM 218 could upgrade the system the appropriate threat points to reflect the vendor alert.

It should be understood that the steps included in method 600 either in its entirety, any individual step, series of steps, or set of steps could be repeated, performed in any order, or simultaneously performed according to one embodiment of the present disclosure.

Accordingly, in one embodiment, the present disclosure provides systems and methods for a self-reliant approach that combines real-time flexibility, long-term correlation, and historical trending with little to no maintenance while satisfying security business intelligence requirements. Thus, the present disclosure generally allows a user to be up and running immediately, and instead of spending time implementing and managing various alert correlation rules, the user saves money and time, protects the facility's network, and mitigates network security risk. Thus, enabling the enterprise can focus efforts on real-time and proactive risk mitigation.

Moreover, unlike conventional systems, the threat management solution of the present disclosure could utilize data collected from third-party logs but does not rely solely on the logs of firewalls and other devices that are routinely breached. The correlation solutions of the present disclosure look for both short-term and long-term mitigation using information gathered for six months or more in an effort to build a picture of a threat.

In addition, unlike traditional SEM/SIM technologies, which only generally collect and aggregate static log report information, SDM 218 or SDM 302c, for example, could provide a smart, integrated system in which log information and other information could be shared, correlated, prioritized, aggregated, and analyzed with other related systems and subsystems to provide feedback and enhanced protection schemes. It should also be understood that other subsystems associated with a particular facility could also provide such enhanced protection schemes in accordance with the present disclosure.

Without affecting the utility of the threat management system of the present disclosure, or the individual components of the threat management system of the present disclosure, the network architecture layers of the threat management system could scale to larger networks with ease. Accordingly, the threat management system of the present disclosure accommodates a multi-tiered hierarchical architecture that provides for secure monitoring of discrete facilities from remote strategically positioned security operation centers (SOC) 302a, as well as the ability to simultaneously monitor all secure facilities from a single, central SOC 302a. In addition, embodiments of the present disclosure easily accommodate redundant systems for disaster recovery, and peered or hierarchical solutions, if necessary.

Even though many of the examples discussed herein are applications of the present disclosure involving electronic transactions on a computer network, it should be understood that embodiments of the present disclosure could also be applied to any system where a transaction requires threat management such as, for example, transactions where threats occur on one or more network devices on any communications network. In addition, embodiments of the present disclosure could be applied in many areas where there is a need to detect threats across a network. Examples of such applications include network security, e-commerce transactions, identity verification transactions, credit card transactions, and the like.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising: performing, by one or more computer systems:
   receiving traffic information generated based, at least in part, upon an analysis of packets directed to a plurality of enterprise assets, each of the plurality of enterprise assets coupled to at least one of a plurality of distinct computer networks;
   receiving vulnerability information generated based, at least in part, upon a scan of the plurality of distinct computer networks, the scan configured to detect vulnerabilities associated with one or more of the plurality of enterprise assets;
   receiving vendor alert information provided by one or more third-party vendors, the vendor alert information related to one or more of the plurality of enterprise assets;
   continuously correlating:
      the received traffic information, vulnerability information, and vendor alert information; and each of at least one security threat of one or more security threats occurring within a first period of time with at least one similar security threat occurring within a second period of time to assess a threat potential of the respective security threat of the at least one security threat;
assigning threat points to the one or more security threats based, at least in part, upon the continuous correlation;
dynamically adjusting a priority of each of the one or more security threats and threat points associated with each of the one or more security threats by escalating a security threat with a highest potential to be successful and modifying a risk associated with other security threats based, at least in part, upon the continuous correlation,
wherein escalating the security threat with the highest potential to be successful comprises:
identifying, based on the received vulnerability information and an age of the vulnerability information, an enterprise asset of the plurality of enterprise assets being vulnerable to the security threat,
wherein a potential for the security threat to be successful against the enterprise asset is based on a degree of vulnerability of the enterprise asset with respect to the security threat and the age of the vulnerability information with respect to the security threat;
associating different security threats of the one or more security threats with different colors, each color being indicative of a different level of priority of a corresponding security threat of the one or more security threats; and
providing the at least one security threat of the one or more security threats for display, wherein each of the at least one security threat is displayed in a color associated with the respective security threat.

2. The method of claim 1, wherein the packets directed to the plurality of enterprise assets include packets intercepted outside of a firewall, packets intercepted inside the firewall, and packets reaching specific ones of the plurality of enterprise assets.

3. The method of claim 2, wherein the traffic information includes a resource violation message reporting an unknown client's attempt to use an unknown protocol.

4. The method of claim 3, wherein assigning the threat points includes upgrading threat points associated with a given security threat in response to the resource violation message being correlated with the vulnerability information.

5. The method of claim 4, wherein assigning the threat points includes upgrading threat points associated with the given security threat in response to the resource violation message being correlated with the vendor alert information.

6. The method of claim 5, wherein the vulnerability information includes an open service port of an enterprise asset.

7. The method of claim 6, wherein assigning the threat points includes upgrading threat points associated with the given security threat in response to the traffic information being correlated with the open service port.

8. The method of claim 7, wherein assigning the threat points includes upgrading an amount of threat points associated with the given security threat in response to the vendor alert information being correlated with the open service port.

9. The method of claim 8, further comprising performing, by the one or more computer systems:
issuing an alert to a customer associated with a first of the plurality of distinct networks in response to a detection of the given security threat in a second of the plurality of distinct networks based, at least in part, upon the assigned threat points, the given security threat common to both the first and second of the plurality of the distinct networks, the given security threat having been undetected in the first of the plurality of distinct networks prior to issuing the alert.

10. A network security and threat management system, comprising:
a computer configured to:
receive traffic information generated based, at least in part, upon an analysis of packets directed to a plurality of enterprise assets, wherein the traffic information includes a resource violation message reporting an unknown client's attempt to use an unknown protocol;
receive vulnerability information generated based, at least in part, upon an analysis of one or more of the plurality of enterprise assets;
receive vendor alert information provided by one or more third-party vendors;
continuously correlate:
the received traffic information, vulnerability information, and vendor alert information; and
each of at least one security threat of a plurality of security threats occurring within a first period of time with at least one similar security threat occurring within a second period of time to assess a threat potential of the respective security threat of the at least one security threat to reduce false positives and to enhance threat relevance of the at least one security threat;
assign threat points to each of the plurality of security threats based, at least in part, upon the continuous correlation, wherein to assign the threat points the computer is further configured to:
upgrade the threat points associated with the given security threat in response to the traffic information being correlated with the vulnerability information;
upgrade the threat points associated with the given security threat in response to the traffic information being correlated with the vendor alert information; and
upgrade the threat points associated with the given security threat in response to the vulnerability information being correlated with the vendor alert information;
dynamically adjust a priority of a given one of the plurality of security threats and threat points associated with the given one of the plurality of security threats by escalating a security threat with a highest potential to be successful and modifying a risk associated with other security threats based, at least in part, upon the continuous correlation and upon an age of the given one of the plurality of security threats,
wherein escalating the security threat with the highest potential to be successful comprises:
identifying, based on the received vulnerability information and an age of the vulnerability information, an enterprise asset of the plurality of enterprise assets being vulnerable to the security threat and the age of the vulnerability information with respect to the security threat, wherein a potential for the security threat to be successful against the enterprise asset is directly proportional to a degree of vulnerability of the enterprise asset with respect to the security threat;
associate different security threats of the plurality of security threats with different colors, each color being indicative of a different level of priority of a corresponding security threat of the plurality of security threats; and
provide the at least one security threat of the plurality of security threats for display, wherein each of the at least one security threat is displayed in a color associated with the respective security threat.

11. The system of claim 10, the computer further configured to:
issue an alert to a customer associated with a first of a plurality of distinct networks in response to a detection of the given one of the plurality of security threats in a second of the plurality of distinct networks based, at least in part, upon the assigned threat points, the given one of the plurality of security threats corresponding to an identified vulnerability common to both the first and second of the plurality of the distinct networks, the given one of the plurality of security threats having been undetected in the first of the plurality of distinct networks prior to issuing the alert.

12. A method, comprising: performing, by one or more computer systems:
receiving traffic information generated based, at least in part, upon an analysis of packets directed to a plurality of enterprise assets, wherein the traffic information includes a resource violation message reporting an unknown client's attempt to use an unknown protocol;
receiving vulnerability information generated based, at least in part, upon vulnerabilities detected in one or more of the plurality of enterprise assets;
receiving vendor alert information provided by one or more third-party vendors, the vendor alert information related to one or more of the plurality of enterprise assets;
increasing a security threat level associated with a given one of a plurality of security threats in response to:
the traffic information being correlated with the vulnerability information, the traffic information being correlated with the vendor alert information, and the vulnerability information being correlated with the vendor alert information; and
each of at least one security threat of the plurality of security threats occurring within a first period of time being correlated with at least one similar security threat occurring within a second period of time to assess a threat potential of the respective security threat of the at least one security threat;
dynamically adjusting a priority of each of the plurality of security threats and threat points associated with each of the plurality of security threats by escalating a security threat of the plurality of security threats with highest potential to be successful and modifying a risk associated with other security threats based, at least in part, upon the continuous correlations,
wherein escalating the security threat with the highest potential to be successful comprises:
identifying, based on the received vulnerability information and an age of the vulnerability information, an enterprise asset of the plurality of enterprise assets being vulnerable to the security threat,
wherein a potential for the security threat to be successful against the enterprise asset is based on a vulnerability of the enterprise asset with respect to the security threat and the age of the vulnerability information with respect to the security threat;
associating different security threats of the plurality of security threats with different colors, each color being indicative of a different level of priority of a corresponding security threat of the plurality of security threats; and
providing the at least one security threat of the plurality of security threats for display, wherein each of the at least one security threat is displayed in a color associated with the respective security threat.

13. The method of claim 12, wherein the packets directed to the plurality of enterprise assets include packets intercepted outside of a firewall, packets intercepted inside the firewall, and packets directed to specific ones of the plurality of enterprise assets.

14. The method of claim 12, wherein the resource violation message is associated with a vulnerability of one of the plurality of enterprise assets.

15. The method of claim 14, wherein the vulnerability information includes an open service port of the one of the plurality of enterprise assets.

16. The method of claim 12, wherein ones of the plurality of enterprise assets are coupled to distinct computer networks.

17. The method of claim 16, further comprising: performing, by the one or more computer systems:
issuing an alert to a customer associated with a first of the distinct networks in response to a detection of the given one of the plurality of security threats in a second of the distinct networks based, at least in part, upon the assigned threat points, the given one of the plurality of security threats common to both the first and the second of the distinct networks, the given one of the plurality of security threats having been undetected in the first of the distinct networks prior to issuing the alert.

* * * * *